US006429945B1

(12) United States Patent
Löffler

(10) Patent No.: US 6,429,945 B1
(45) Date of Patent: Aug. 6, 2002

(54) METHOD OF CORRECTING THE POSITION OF AN IMAGE TO BE PRINTED ON A PRINTING MATERIAL

(75) Inventor: Gerhard Löffler, Walldorf (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 08/724,362

(22) Filed: Oct. 1, 1996

Related U.S. Application Data

(63) Continuation of application No. 08/377,267, filed on Jan. 24, 1995.

(30) Foreign Application Priority Data

Jan. 24, 1994 (DE) ........................................ 44 019 00

(51) Int. Cl.[7] ........................................ G06K 15/00
(52) U.S. Cl. ........................................ 358/1.12; 358/1.1
(58) Field of Search ........................................ 358/1.12, 1.5, 358/1.1, 1.6, 1.18, 496, 488, 486, 497; 356/394, 399, 400, 401

(56) References Cited

U.S. PATENT DOCUMENTS

| | | | | |
|---|---|---|---|---|
| 4,242,662 A | * 12/1980 | Tsujiyama et al. | 382/149 |
| 4,277,176 A | 7/1981 | Grosvernier | 356/394 |
| 4,367,045 A | 1/1983 | Grosvernier | 356/394 |
| 4,755,855 A | * 7/1988 | Watanabe | 355/317 |
| 4,960,336 A | * 10/1990 | Brooks et al. | 400/61 |
| 4,963,029 A | * 10/1990 | Kipphan | 356/401 |
| 5,037,080 A | * 8/1991 | Wirz | 271/107 |
| 5,050,994 A | * 9/1991 | Kipphan et al. | 101/147 |
| 5,101,473 A | * 3/1992 | Kotaki | 395/111 |
| 5,297,789 A | 3/1994 | Filsinger et al. | 271/245 |

FOREIGN PATENT DOCUMENTS

| | | |
|---|---|---|
| DE | 22 20 625 B2 | 12/1972 |
| DE | 2847619 | 5/1979 |
| DE | 2848963 | 8/1979 |
| DE | 2847610 | 6/1987 |
| DE | 39 16 405 A1 | 11/1989 |
| EP | 0474268 | 3/1992 |

OTHER PUBLICATIONS

DE–Z: Der Polygraph 21–90, 2172–2174: "Rechner und CCD–Kamera regeln den Passer vollautmatoisch";

* cited by examiner

*Primary Examiner*—Gabriel Garcia
(74) *Attorney, Agent, or Firm*—Laurence A. Greenberg; Werner H. Stemer; Gregory L. Mayback

(57) ABSTRACT

A method for image position correction in printing on a printing material, wherein the printing material is traveling along a travel path through a printing machine by devices of a transporting arrangement, and wherein a positioning device is provided for aligning the distances and parallelities of the printed image in relation to the edges of the printing material, the method which includes generating by devices of at least one image pickup device disposed in the travel path of the printing material image signals from at least one surface of the printing material, wherein the image signals contain information pertaining to the distances and parallelity of the printed image in relation to the edges of the printed material, transmitting the image signals to a steering- or control device, and adjusting with the steering- or control device by means of signals applied to aforesaid positioning device the printed image so as to attain alignment of the image in relation to the distances from and parallelity with the edges of the printing material.

3 Claims, 1 Drawing Sheet

METHOD OF CORRECTING THE POSITION OF AN IMAGE TO BE PRINTED ON A PRINTING MATERIAL

This application is a continuation of application Ser. No. 08/377,267, filed on Jan. 24, 1995.

BACKGROUND OF THE INVENTION

Field of the Invention

The invention relates to a method of correcting the position of an image to be printed on a printing material.

Usually printing machines are provided with forward stops and side stops which serve to position sheets to be printed in precise positions in the printing machine.

By way of example U.S. Pat. No. 5,297,789 shows details of a front stop ("lay") for a printing machine. A side stop is typically constructed along the same lines. U.S. Pat. No. 5,297,789 is incorporated into this application by reference.

By these means a defined position of the printed image on the sheet is attained. The forward and side stops are adjustable, so that correction of the image position is possible. To that end the distance to the edges and parallel orientation of the image with respect to a test sheet is visually determined or manually measured, and the side stops are adjusted manually or by means of a motor.

Another approach to the image position correction is attained by means of the register adjustment devices provided for adjusting the printing form on the cylinders. This solution is, however, only practical when a small adjusting range is sufficient.

It is also known to examine with examining or scanning devices the entire surface of a printed material inside or away from a printing machine. The measuring signals from the scanning devices are used to interact with the processes for controlling the inking of the image.

SUMMARY OF THE INVENTION

It is the object of the invention to provide a method for image position correction which results in an independent method for correcting image position.

This object is attained according to the inventive concept, thereby that during printing on a printing material, image signals are generated by means of an image pickup device placed in the travel path of the image, wherein the image signals are taken from at least one surface of the printed material. From these image signals measuring values are obtained, which relate to the distance and degree of parallelity of the printed image in relation to the printed material, so that an image position correction can be attained.

The invention is especially advantageous when applied to sheet printing machines equipped with adjustable front and side stops for correction of the image position. An embodiment of the invention relates to a printing machine having a steering or control device arranged for so-called first form and perfector printing, and which additionally has devices for adjusting the turning registers. In that manner it is possible to simultaneously correct the image position on both the front and back of the printing material.

With the foregoing and other objects in view there is provided a method for image position correction in printing on a printing material, wherein the printing material is traveling along a travel path through a printing machine by means of a transporting arrangement, and wherein a positioning device is provided for aligning the distances and parallelities of the printed image in relation to the edges of the printing material, the method which includes the steps of:

- generating by means of at least one image pickup device disposed in the travel path of the printing material image signals from at least one surface of the printing material, wherein the image signals contain information pertaining to the distances and parallelity of the printed image in relation to the edges of the printed material;
- transmitting the image signals to a steering- or control device; and
- adjusting with the steering- or control device by means of the image signals applied to aforesaid positioning device the printed image so as to attain alignment of the image in relation to the distances from and parallelity with the edges of the printing material.

In accordance with another feature of the invention, there is provided a device for correcting image position on a printing material in a printing machine having a transporting arrangement for transporting the printing material through the printing machine, and a positioning device for aligning the distances and parallelity of the printed image in relation to the edges of the printing material, the device which includes an image pickup device for picking up image position signals relating to distance and alignment of the image in regard to the edges of the printing material; a steering- or control device for receiving the image position signals and computing adjustment data for the image position, and setting means for receiving the adjustment data and setting the image to an adjusted position.

In accordance with a concomitant feature of the invention there is provided a device according to the invention, which includes in the printing machine means for performing first form and perfector printing, said means having a turning register, and devices for adjusting the turning register connected with said steering- or control device to attain alignment with the printing material.

Other features which are considered as characteristic for the invention are set forth in the appended claims.

Although the invention is illustrated and described herein as embodied in a method of correcting the position of an image to be printed on a printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
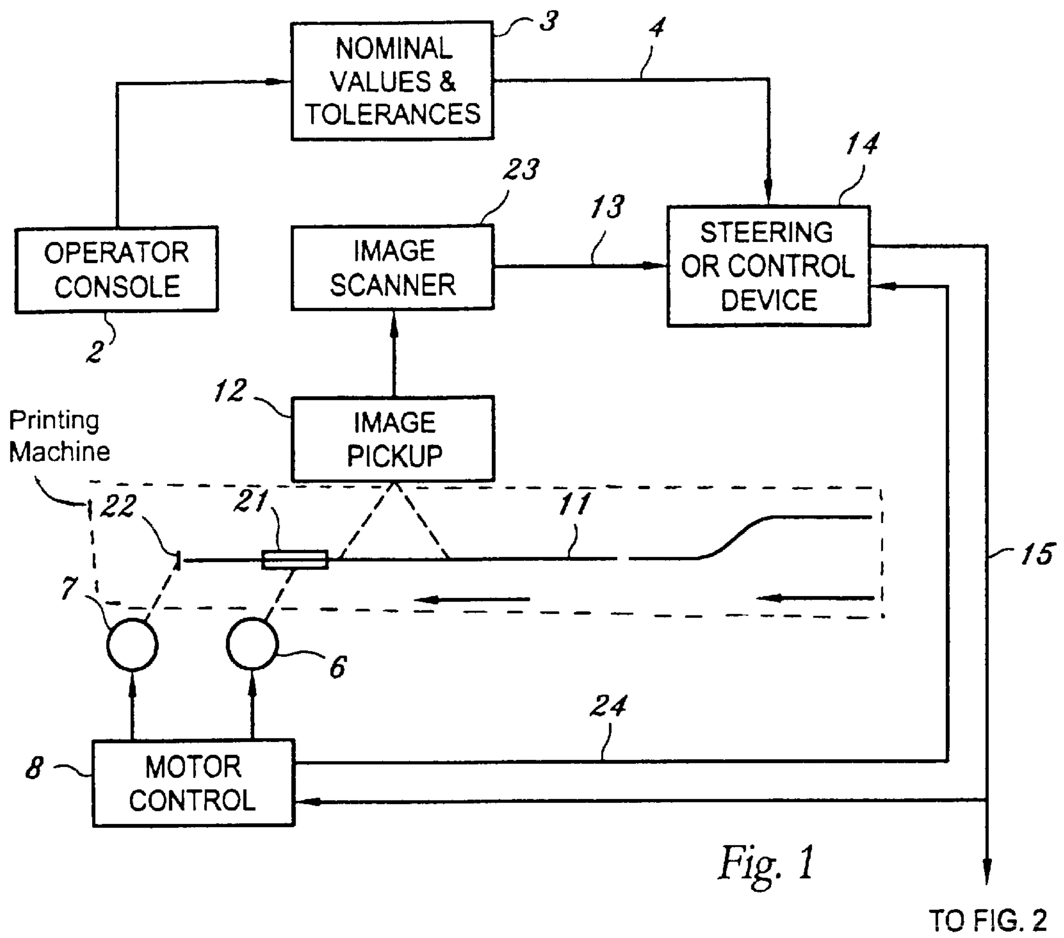
FIG. 1 is a block diagram showing the basic elements of the invention using front and side stops for adjusting image position.

Before printing, nominal values and tolerances for image parallelity and for the distances of the image to the edges in the printing direction and to the sides of the printing material are entered.

In multicolor printing these values are advantageously entered in the standard ink colors.

During the set-up phase in preparation for repeat printing image signals from all printing sheets and the images printed thereon are obtained by means of an image pickup device, and transmitted to the steering- or control device. The steering- or control device processes the image signals in regard to, for example, measured values for the distances and parallelity of the sheet edges and compares these values with the entered nominal values. The steering- or control device processes the image signals to, for example, measuring values for the distances to and parallelity with the sheet edges, and compares them with the nominal values.

If deviations of the image position on the first printed side of the sheet are determined, the steering- or control device issues position signals for the positioning motors on the front and side stops. By means of the positioning motors the front-and side stops are change, so that the image deviations fall within the allowable tolerances.

If the deviations of the image position of an image printed, after turning of the image in first form and perfector printing, in regard to the image on the first printed side, are determined, then position signals are issued by means of the steering- or control device to the positioning motors for the circumferential-, side-, and diagonal register of the first printing unit following the turning. In obtaining these positioning signals for the turning register, the earlier obtained correction values for the circumferential- and side registers are taken into consideration.

If the steering- or control device is connected with an operator console, which is equipped with display elements, it becomes possible to keep the machine operator continuously informed of the actual deviations from the nominal position.

Ordinarily the positioning procedures are terminated at the end of the setup phase. It is, however, possible to perform corrections to the image position also during the continued printing. The application of the invention is not limited to sheet printing machines. It is also applicable to web printing machines in regard to side correction of the printed image.

Before printing is started nominal position values and tolerances are entered by a machine operator from an operator console 2, into a nominal value and tolerance memory 3. The nominal values prescribe values for positioning of an image i on a printed sheet 11, and tolerances that are acceptable in positioning of the printed image on the sheet 11. In particular the nominal values prescribe distances of the image to the edges of sheet 11 and tolerances for parallelity, which are defined, e.g. as angular values. It follows that the positioning parameters may alternatively be presented as coordinates of the image corners in a coordinate system arranged with the sheet edges as the major axes X, Y of the coordinate system.

The nominal values and tolerances are transmitted via a data line 4 to a steering- or control device 14, which is advantageously arranged as a conventional process computer.

A printed sheet 11 is transported through the printing machine by conventional sheet transport means (not shown) and is positioned at an intermediate sheet position by a front stop 22 and a side stop 21 in conventional manner. Each stop 21, 22 is adjustable by means of respective servo motors 6, 7 connected to a motor control 8.

An image pickup 12 e.g. in the form of a conventional video camera is suspended above the sheet 11 and is connected to an image scanner 23 which operates to scan the electrical image generated in the video camera of the printed image i on the sheet 11. The image scanner 23 determines in conventional manner the positions of the border lines of the image in relation to the edges of the sheet 11.

Figure 3:
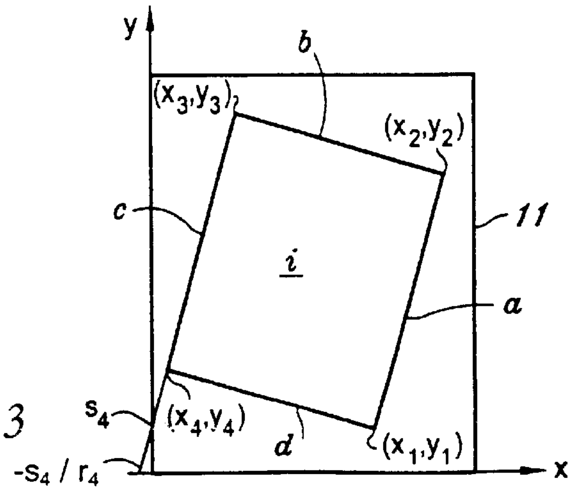
FIG. 3 is a diagram showing an image printed on a sheet and definitions of position data.

FIG. 3 shows an image i having sides a, b, c and d printed on a sheet 11. The sheet defines by two adjoining edges a coordinate system X, Y, wherein the four corners of the image i are located at coordinates ($X_1$, $Y_1$), ($X_2$, $Y_2$), ($X_3$, $Y_3$), and ($X_4$, $Y_4$).

According to the analytical geometry each side of the image is defined by the two corner points being intersected by a line defining the respective side. Each side is defined in the coordinate system by an equation:

$$Y=r_n x-s_n$$

wherein parameters r and s are defined as the points wherein each side, if extended, would intersect, respectively, the y-axis and the x-axis. Image side c is shown extended in this manner and intersects the y-axis in point $s_4$ and the x-axis in point $-s_4/r_4$. The image scanner 23 determines all points of each side a, b, c and d as the point wherein the image of the scanning-spot determines a transition from the color of the printed material to the color of the image. It follows that only two points are required to define each image side. The image data are transmitted from the image scanner 23 via data line 13 to the steering- or control device 14. The position of the sheet 11 is defined by the known positions of the front stop 22, and side stop 21. The position of front stop 22 and side stop 21 is controlled by a respective servo motor 6 and 7. The servo motors are controlled in well-known manner by motor control 8, which at all times contains information as to the position of each stop 21, 22.

The steering- or control device 14 receives data as to the position of stops 21, 22 via data line 24.

The steering- or control device computes on basis of the sheet position information data from motor control 8 and the image position information data from image scanner 23, the exact position of the image i within the perimeter of the sheet 11, and determines if the image position data are within the nominal values and tolerances received from memory 3. If the image position data indicate that the image i is outside the tolerances entered by the operator via operator console 2, position correction data are computed by the steering- or control device 14 and transmitted via data line 15 to motor control 8, which resets the side and front stops 21, 22 to positions within the acceptable tolerances.

Figure 2:
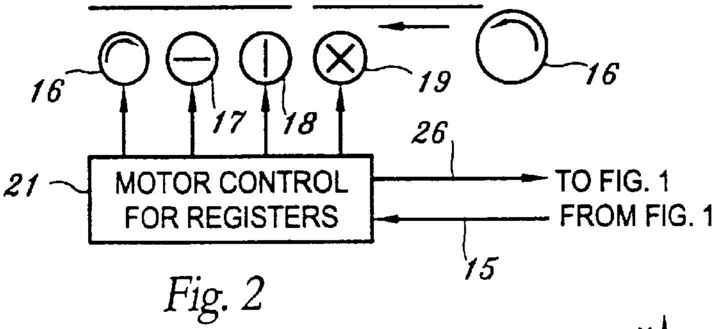
FIG. 2 is a block diagram using register controls for adjusting image position.

FIG. 2 shows an alternate arrangement of the invention, wherein register motors 16, 17, 18 and 19 operate to adjust the position of the respective circumferential, side, turning, and diagonal registers. These registers and their operation are conventional in the printing art, and are therefore not disclosed in further detail. The adjustment of the registers 16–19 is performed by means of control data computed by the steering- or control circuit 14 on the basis of the register position data available from the motor control 21 and transmitted via data line 26 to the steering- or control device 14. The steering- or control device computes the required adjustment data which are returned from the steering- or control device 14 on data line 15.

What is claimed is:

1. Method for image position correction in printing on a printing material, wherein the printing material is traveling along a travel path through a printing machine by means of a transporting arrangement, and wherein a positioning device is provided for aligning distances and parallelities of a printed image in relation to the edges of the printing material, the method which comprises the steps of:

generating by means of at least one image pickup device disposed in the travel path of the printing material image signals from the entire printing material and the printed image of at least one surface of the printing material, wherein the image signals contain information pertaining to the distances and parallelity of the printed image in relation to the edges of the printed material;

transmitting the image signals to a steering- or control device;

comparing the image signals with pre-entered nominal values in the steering- or control device; and adjusting the printed image with the steering- or control device by means of the image signals applied to the positioning device so as to attain alignment of the printed image in relation to the distances from and parallelity with the edges of the printing material.

2. Device for correcting image position on a printing material in a printing machine having a transporting arrangement for transporting the printing material through the printing machine, and a positioning device for aligning distances and parallelity of a printed image in relation to the edges of the printing material, the device which comprises:

an image pickup device for picking up image signals from the entire printing material and the printed image and producing image position signals relating to distance and alignment of the printed image in regard to the edges of the printing material;

a steering- or control device for receiving the image position signals and computing adjustment data for the image position; and setting means for receiving the adjustment data and setting the printed image to an adjusted position.

3. Device according to claim 2, further comprising a turning register, and a positioning motor for adjusting said turning register, said positioning motor connected with said steering- or control device.

* * * * *